US010022677B2

(12) United States Patent
He et al.

(10) Patent No.: US 10,022,677 B2
(45) Date of Patent: *Jul. 17, 2018

(54) GAS SEPARATION MEMBRANES BASED ON PERFLUORINATED POLYMERS

(71) Applicants: Membrane Technology and Research, Inc., Newark, CA (US); Yoshiyuki Okamoto, Brooklyn, NY (US); Yasuhiro Koike, Yokohama-shi, Kanagawa-ken (JP)

(72) Inventors: Zhenjie He, Fremont, CA (US); Timothy C. Merkel, San Jose, CA (US); Yoshiyuki Okamoto, Brooklyn, NY (US); Yasuhiro Koike, Yokohama (JP)

(73) Assignee: Membrane Technology and Research, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/158,032

(22) Filed: May 18, 2016

(65) Prior Publication Data

US 2016/0256835 A1 Sep. 8, 2016

Related U.S. Application Data

(63) Continuation of application No. 14/330,714, filed on Jul. 14, 2014, now Pat. No. 9,403,120, which is a (Continued)

(51) Int. Cl.
*B01D 53/22* (2006.01)
*B01D 71/06* (2006.01)
*B01D 71/32* (2006.01)

(52) U.S. Cl.
CPC .......... *B01D 71/32* (2013.01); *B01D 53/228* (2013.01); *B01D 2256/245* (2013.01);
(Continued)

(58) Field of Classification Search
CPC ...... B01D 53/22; B01D 53/228; B01D 71/06; B01D 71/32; B01D 2256/245;
(Continued)

(56) References Cited

U.S. PATENT DOCUMENTS 3,133,132 A 5/1964 Loeb et al.
3,308,107 A 3/1967 Selman et al.
(Continued)

OTHER PUBLICATIONS

Yang, et al, "Novel Amorphous Perfluorocopolymeric System; Copolymers of Perfluoro-2-methylene-1,3-dioxolane Derivatives," Journal of Polymer Science, vol. 44, pp. 1613-1618 (2006).
(Continued)

*Primary Examiner* — Jason M Greene
(74) *Attorney, Agent, or Firm* — Timothy A. Hott; Suk H. Chow

(57) ABSTRACT

Disclosed herein is a process for separating components of a gas mixture using gas-separation copolymer membranes. These membranes use a selective layer made from copolymers of perfluorodioxolane monomers. The resulting membranes have superior selectivity performance for gas pairs of interest while maintaining fast gas permeance compared to membranes prepared using conventional perfluoropolymers, such as Teflon® AF, Hyflon® AD, and Cytop®.

21 Claims, 5 Drawing Sheets

Related U.S. Application Data continuation of application No. 14/184,308, filed on Feb. 19, 2014, now Pat. No. 8,828,121.

(52) U.S. Cl.
CPC .. *B01D 2257/102* (2013.01); *B01D 2257/108* (2013.01); *B01D 2257/11* (2013.01); *B01D 2257/504* (2013.01); *Y02C 10/10* (2013.01)

(58) Field of Classification Search
CPC ........ B01D 2257/102; B01D 2257/108; B01D 2257/11; B01D 2257/504
See application file for complete search history.

(56) References Cited

U.S. PATENT DOCUMENTS

| | | | |
|---|---|---|---|
| 4,230,463 A | | 10/1980 | Henis et al. |
| 4,863,761 A | | 9/1989 | Puri |
| 5,051,114 A | * | 9/1991 | Nemser ................ B01D 53/228 95/47 |
| 5,141,642 A | | 8/1992 | Kusuki et al. |
| 5,156,888 A | | 10/1992 | Haubs et al. |
| 5,242,636 A | | 9/1993 | Sluma et al. |
| 5,318,417 A | | 6/1994 | Kopp et al. |
| 5,408,020 A | | 4/1995 | Hung et al. |
| 6,361,582 B1 | | 3/2002 | Pinnau et al. |
| 6,361,583 B1 | | 3/2002 | Pinnau et al. |
| 6,544,316 B2 | | 4/2003 | Baker et al. |
| 6,572,679 B2 | | 6/2003 | Baker et al. |
| 6,572,680 B2 | | 6/2003 | Baker et al. |
| 6,579,341 B2 | | 6/2003 | Baker et al. |
| 6,592,650 B2 | | 7/2003 | Pinnau et al. |
| 7,582,714 B2 | | 9/2009 | Okamoto et al. |
| 7,635,780 B2 | | 12/2009 | Okamoto et al. |
| 7,754,901 B2 | | 7/2010 | Okamoto et al. |
| 8,828,121 B1 | * | 9/2014 | He ......................... B01D 71/32 95/45 |
| 9,403,120 B2 | * | 8/2016 | He ......................... B01D 71/32 |
| 2012/0190091 A1 | * | 7/2012 | Huang ................ B01D 53/228 435/161 |

OTHER PUBLICATIONS

Liu, et al., Synthesis and Radical Polymerization of Perfluoro-2-methylene-1,3-dioxolanes, Macromolecules, vol. 38, pp. 9466-9478 (2005).

Koike, et al, Synthesis and Characterization of Copolymers of Perfluoro(2-methylene-4,5-dimethyl-1,3-dioxolane) and Perfluoro(2-methylene-1,3-dioxolane), Journal of Fluorine Chemistry, vol. 156, pp. 198-202 (2013).

Mikes, et al, Characterization and Properties of Semicrystalline and Amorphous Perfluoropolymer: Poly(perfluoro-2-methylene-1,3-dioxolane), Polym. Adv. Technol. vol. 22, pp. 1272-1277 (2011).

Chiou and Paul, "Gas Permeation in a Dry Nafion Membrane," Industrial and Engineering Chemistry Research, Inc., vol. 27, pp. 2161-2164 (1988).

Okamoto, et al, "Synthesis and Properties of Amorphous Perfluorinated Polymers," Chemistry Today, vol. 27, pp. 46-48 (2009).

* cited by examiner

GAS SEPARATION MEMBRANES BASED ON PERFLUORINATED POLYMERS

CROSS-REFERENCE TO RELATED APPLICATIONS

This application is a continuation of U.S. application Ser. No. 14/330,714, filed on Jul. 14, 2014 and issued as U.S. Pat. No. 9,403,120 on Aug. 2, 2016, which is a continuation of Ser. No. 14/184,308, filed on Feb. 19, 2014 and issued as U.S. Pat. No. 8,828,121 on Sep. 9, 2014, all of which are hereby incorporated by reference in their entireties.

FIELD OF THE INVENTION

The invention relates to membrane-based gas separation processes. In particular, the invention relates to gas separation processes using copolymer membranes containing perfluorodioxolane monomers.

BACKGROUND OF THE INVENTION

Presented below is background information on certain aspects of the present invention as they may relate to technical features referred to in the detailed description, but not necessarily described in detail. The discussion below should not be construed as an admission as to the relevance of the information to the claimed invention or the prior art effect of the material described.

The search for a membrane for use in gas separation applications that combines high selectivity with high flux continues. Current perfluoropolymer membranes, such as Hyflon® AD (Solvay), Teflon® AF (Du Pont), Cytop® (Asahi Glass), and variants thereof, have excellent chemical resistance and stability. We reported earlier, in U.S. Pat. No. 6,361,583, membranes that are made from glassy polymers or copolymers, including Hyflon® AD, and are characterized by having repeating units of a fluorinated, cyclic structure. In general, the ring structures in these materials frustrate polymer chain packing yielding amorphous polymers with relatively high gas permeability. These developed membranes are also more resistant to plasticization by hydrocarbons than prior art membranes and are able to recover from accidental exposure to liquid hydrocarbons.

It is known that copolymerization of fluorinated cyclic monomers with tetrafluoroethylene (TFE) enhances the chemical resistance and physical rigidity of membranes. TFE is also known to improve processability and has the effect of lowering gas permeability and increasing size selectivity in Hyflon® AD and Teflon® AF. Therefore, combinations of TFE with other monomer units, in particular perfluorinated dioxoles, such as Teflon® AF and Hyflon® AD, that result in overall amorphous, yet rigid, highly fluorinated, copolymers are preferred for industrial membrane applications. However, a drawback to these membranes is that their selectivities are relatively low for a number of gas pairs of interest, including $H_2/CH_4$, $He/CH_4$, $CO_2/CH_4$, and $N_2/CH_4$.

Other than the commercially available perfluoropolymers, there is very limited gas transport data available for fully fluorinated polymers. Paul and Chio, "Gas permeation in a dry Nafion membrane," Industrial & Engineering Chemistry Research, 27, 2161-2164 (1988), examined gas transport in dry Nafion® (an ionic copolymer of TFE and sulfonated perfluorovinyl ether) and found relatively high permeabilities and selectivities for several gas pairs ($He/CH_4$, $He/H_2$, and $N_2/CH_4$) compared to conventional hydrocarbon-based polymers considered for membrane applications. Nafion® and related ionic materials are used to make ion exchange membranes for electrochemical cells and the like. Because of their high cost and need for carefully controlled operating conditions, such as adjusting the relative humidity of the feed gas to prevent polymer swelling and loss of performance, these ionic membranes are not suitable for industrial gas separations.

Despite the improvements described above, there remains a need for better gas separation membranes, and specifically for improved membranes combining high flux, high selectivity, and good chemical resistance.

Recently, there have been reports of a new class of non-ionic amorphous perfluoropolymers. U.S. Pat. Nos. 7,582,714; 7,635,780; 7,754,901; and 8,168,808, all to Yoshiyuki Okamoto, disclose compositions and processes for making perfluoro-2-methylene-1,3-dioxolane derivatives.

Yang et al., "Novel Amorphous Perfluorocopolymeric System; Copolymers of Perfluoro-2-methylene-1,3-dioxolane Derivatives," Journal of Polymer Science: Part A: Polymer Chemistry, Vol. 44, 1613-1618 (2006), and Okamoto et al., "Synthesis and properties of amorphous perfluorinated polymers," Chemistry Today, vol. 27, n. 4, pp. 46-48 (July-August 2009), disclose the copolymerization of two dioxolane derivatives, perfluorotetrahydro-2-methylene-furo[3,4,-d][1,3]dioxolane and pefluoro-2-methylene-4-methoxymethyl-1,3-dioxolane. The copolymers were found to be thermally stable, have low refractive indices, and high optical transparency from UV to near-infrared, making them ideal candidates for use in optical and electrical materials.

U.S. Pat. No. 3,308,107, to Du Pont, discloses a similar dioxolane derivative, perfluoro-2-methylene-4-methyl-1,3-dioxolane. Homopolymers and copolymers of perfluoro-2-methylene-4-methyl-1,3-dioxolane with TFE are also disclosed.

U.S. Pat. No. 5,051,114, also to Du Pont, discloses the testing of poly-[perfluoro-2-methylene-4-methyl-1,3-dioxolane] for use in a membrane for gas separation. The results indicated that this material exhibited gas permeabilities 2.5 to 40 times lower as compared to dipolymer membranes of perfluoro-2,2-dimethyl-1,3-dioxole and TFE, but had higher selectivities.

To date, however, there have been no studies using copolymers of the perfluoropolymers described by Yang et al. and Okamoto et al. in membranes for gas separation processes.

SUMMARY OF THE INVENTION

The present invention relates to a process for separating components of a gas mixture whereby the gas mixture is passed across an improved separation membrane having a selective layer formed from a copolymer of perfluorodioxolane monomers.

In a basic embodiment, the invention is a process for separating two components, A and B, of a gas mixture, comprising:

(a) passing the gas mixture across a separation membrane having a feed side and a permeate side, the separation membrane having a selective layer comprising a copolymer comprising at least two perfluorodioxolane monomers;

(b) providing a driving force for transmembrane permeation;

(c) withdrawing from the permeate side a permeate stream enriched in component A compared to the gas mixture;

(d) withdrawing from the feed side a residue stream depleted in component A compared to the gas mixture.

Membranes previously developed for gas separation processes have incorporated the use of amorphous homopolymers of perfluorinated dioxoles, dioxolanes, or cyclic acid, ethers, or copolymers of these with tetrafluoroethylene. However, the use of TFE results in membranes that lack high selectivities for components of a gas mixture.

To address these performance issues, particularly preferred materials for the selective layer of the membrane used to carry out the process of the invention are perfluorodioxolane monomers selected from the group consisting of the structures found in Table 1, below:

TABLE 1

Perfluorodioxolane Monomers (Monomer A)

Perfluorotetrahydro-2-methylene-furo[3,4-d][1,3]-dioxolane (Monomer B)

Perfluoro-2-methylene-4-methyl-1,3,-dioxolane (Monomer C)

Perfluoro-2-methylene-4-methoxymethyl-1,3-dioxolane (Monomer D)

Perfluoro-2-methylene-4,5-dimethyl-1,3,-dioxolane

TABLE 1-continued

Perfluorodioxolane Monomers (Monomer E)

Perfluoro-3-methylene-2,4-dioxabicyclo [4,3,0]nonane (Monomer F)

Perfluoro-3-methylene-2,4-dioxabicyclo-[3,3,0] octane (Monomer G)

Perfluoro-2-methylene-4,5-dimethoxymethyl-1,3-dioxolane (Monomer H)

Perfluoro-2-methylene-1,3-dioxolane

An important advantage of the present invention is that use of perfluorinated dioxolane copolymers in the membrane can result in higher selectivity for desired gases than can be obtained using prior art membranes that incorporate TFE or cyclic perfluorinated homopolymers.

In another embodiment, the present invention relates to a process for separating two components, A and B, of a gas mixture, comprising:

(a) passing the gas mixture across a separation membrane having a feed side and a permeate side, the separation membrane having a selective layer comprising a copolymer formed from a first perfluorodioxolane monomer having the formula

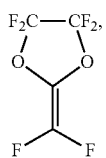

and a second perfluorodioxolane monomer selected from the group consisting of the structures found in Table 1 with the exception of Monomer H.

(b) providing a driving force for transmembrane permeation;

(c) withdrawing from the permeate side a permeate stream enriched in component A compared to the gas mixture; and (d) withdrawing from the feed side a residue stream depleted in component A compared to the gas mixture.

Representative membranes having particularly high selectivity are those formed from perfluoro-2-methylene-1,3-dioxolane and perfluoro-2-methylene-4,5-dimethyl-1,3-dioxolane. Thus, a most preferred copolymer is one having the structure:

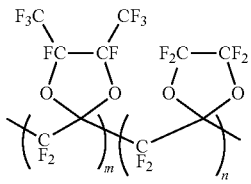

where m and n are positive integers.

In certain aspects, the copolymer is a dipolymer containing at least 25 mol % or greater of perfluoro-2-methylene-1,3-dioxolane.

Due to their advantageous properties, the membranes and processes of the invention are useful for many gas separation applications. Specific examples include, but are not limited to the separation of various gases, for example, nitrogen, helium, carbon dioxide, and hydrogen from methane.

The gas mixture may contain at least two components, designated component A and component B, that are to be separated from each other and optionally another component or components in the stream. The permeating desired gas may be either a valuable gas that is desired to retrieve as an enriched product, or a contaminant that is desired to remove. Thus, either the permeate stream or the residue stream, or both, may be the useful products of the process.

In certain aspects, the invention is a process for separating two components, A and B, of a gas mixture wherein component A is hydrogen and component B is methane. Such a mixture may be found in a steam reforming process. For example, the process of the invention may be used to recover hydrogen from synthesis gas, to remove carbon dioxide from synthesis gas, or to adjust the ratio of hydrogen to carbon monoxide in synthesis gas.

In certain aspects, the invention is a process for separating two components, A and B, of a gas mixture wherein component A is carbon dioxide and component B is methane. This process may be involved in carbon capture and storage or used in the separation of $CO_2$ from natural gas.

In other aspects, the invention is a process for separating two components, A and B, of a gas mixture wherein component A is nitrogen and component B is methane. This process may be involved in removing nitrogen from nitrogen-contaminated natural gas.

In yet another aspect, the invention is a process for separating two components, A and B, of a gas mixture wherein component A is helium and component B is methane. This process may be useful for producing helium through natural gas extraction and subsequent purification.

DETAILED DESCRIPTION OF THE INVENTION

Figure 1:
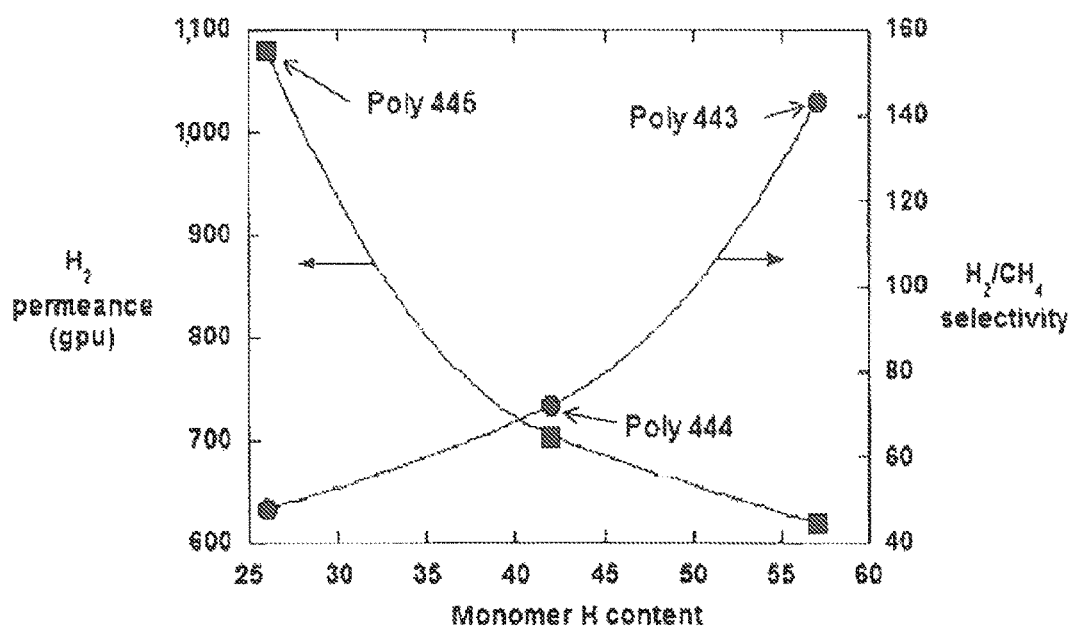
FIG. 1 is a graph showing pure gas $H_2$ permeance and $H_2/CH_4$ selectivity as a function of Monomer H content for membranes with selective layers composed of copolymers of Monomers D and H (Polymers 443, 444, and 445).
Figure 2:
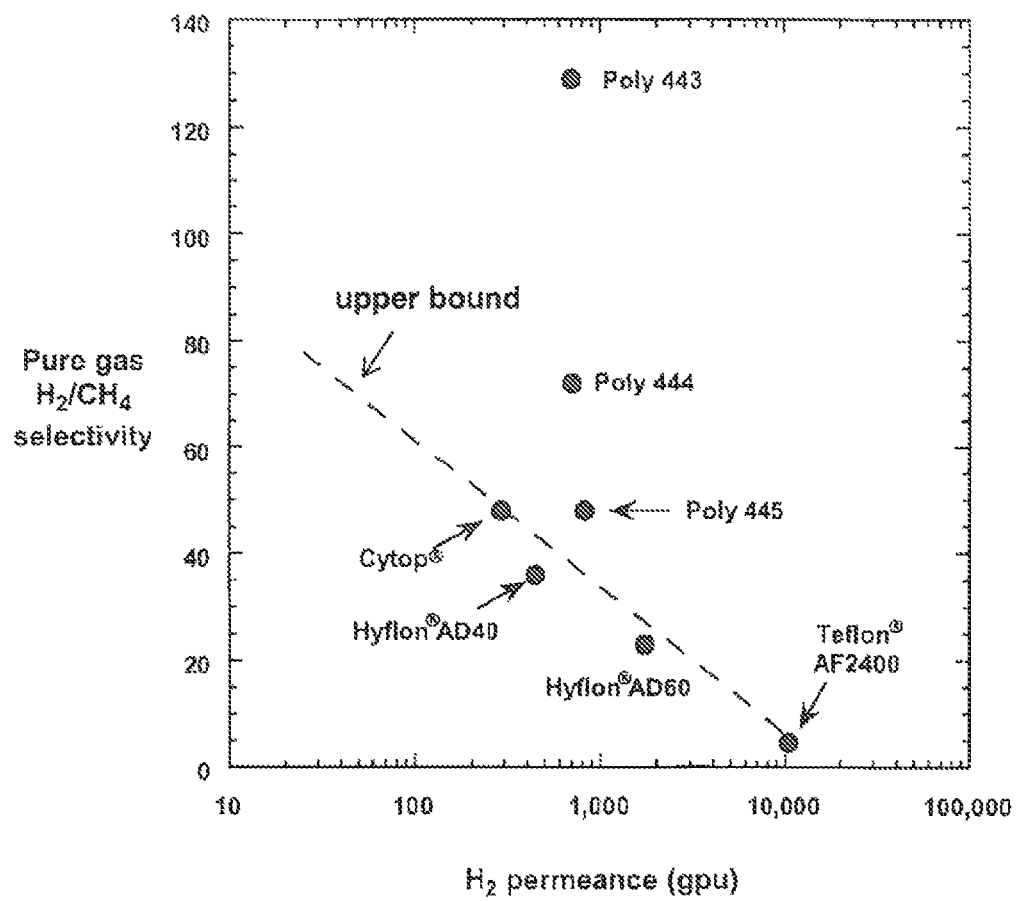
FIG. 2 is a graph showing $H_2/CH_4$ selectivity as a function of $H_2$ permeance for membranes made from commercial perfluoropolymers (Cytop®, Hyflon® AD, and Teflon® AF) and Polymers 443, 444, and 445.
Figure 3:
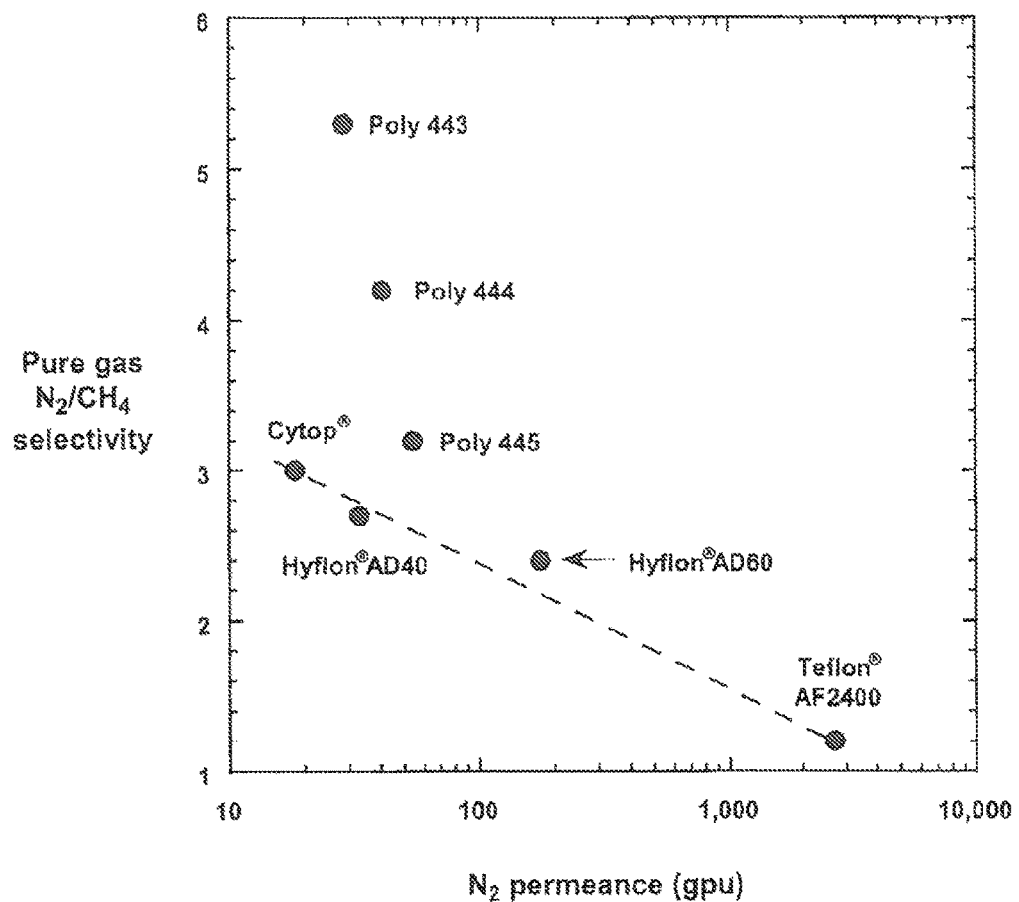
FIG. 3 is a graph showing $N_2/CH_4$ selectivity as a function of $N_2$ permeance for membranes made from commercial perfluoropolymers (Cytop®, Hyflon® AD, and Teflon® AF) and Polymers 443, 444, and 445.
Figure 4:
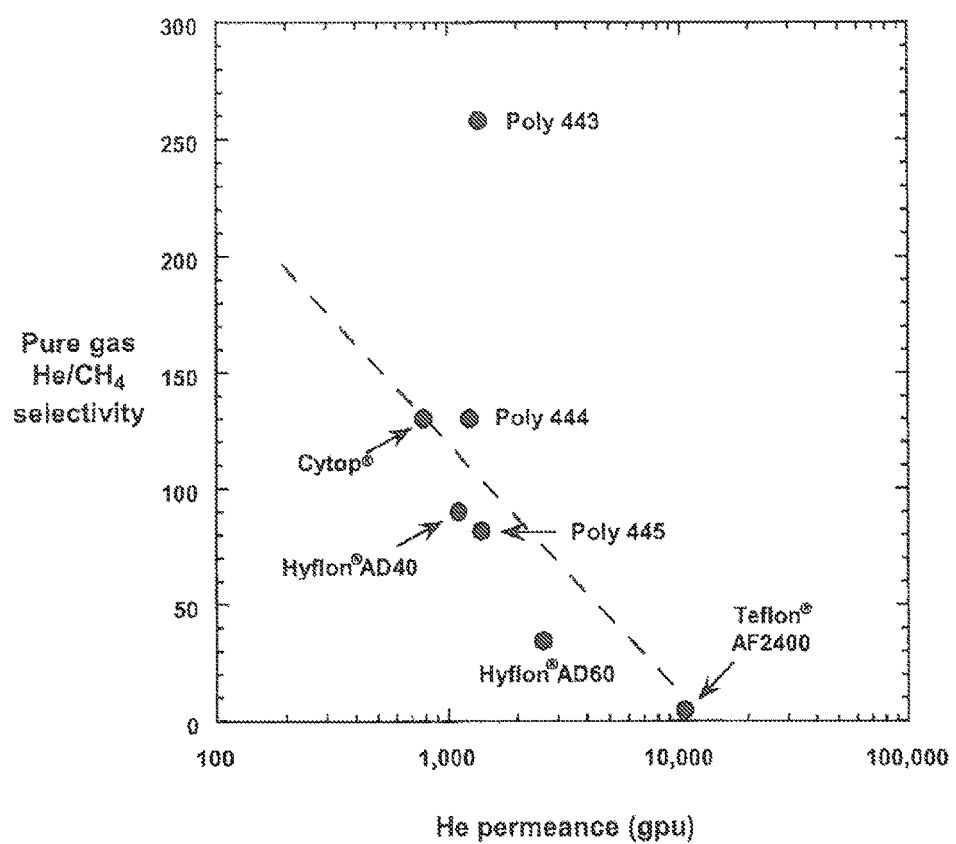
FIG. 4 is a graph showing $He/CH_4$ selectivity as a function of He permeance for membranes made from commercial perfluoropolymers (Cytop®, Hyflon® AD, and Teflon® AF) and Polymers 443, 444, and 445.
Figure 5:
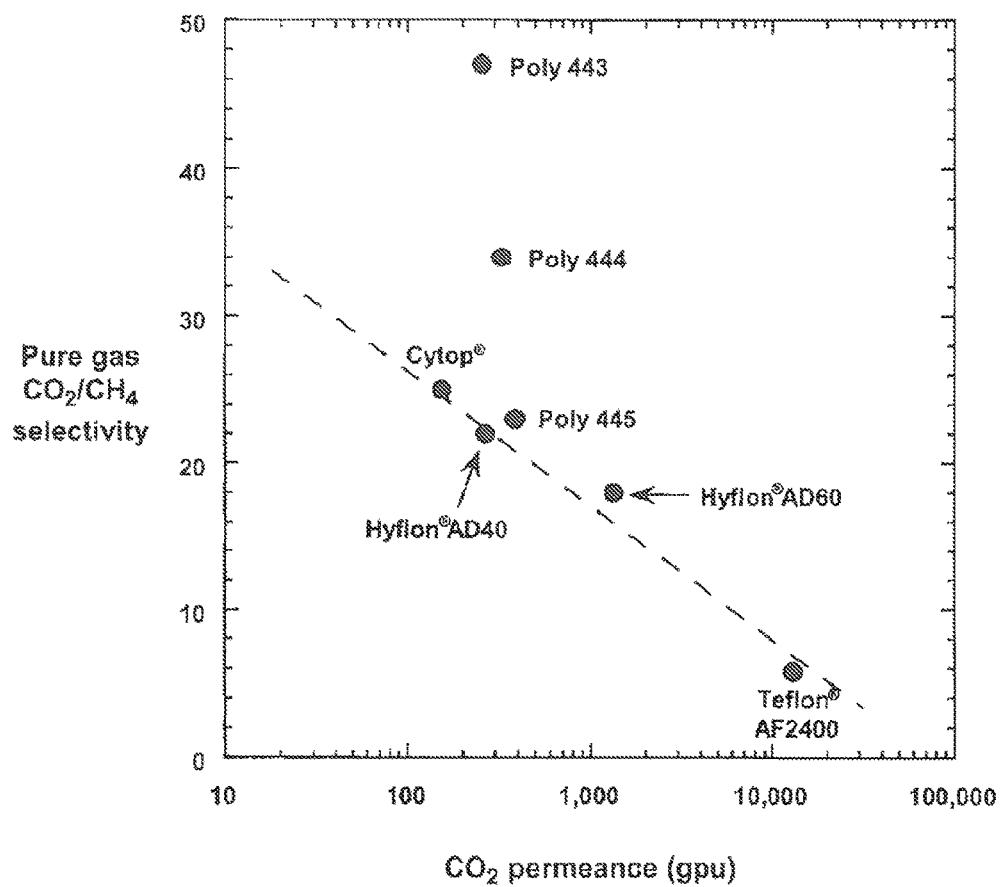
FIG. 5 is a graph showing $CO_2/CH_4$ selectivity as a function of $CO_2$ permeance for membranes made from commercial perfluoropolymers (Cytop®, Hyflon® AD, and Teflon® AF) and Polymers 443, 444, and 445.

The term "gas" as used herein means a gas or a vapor.

The term "polymer" as used herein generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic and atactic symmetries.

The term "highly fluorinated" as used herein means that at least 90% of the total number of halogen and hydrogen atoms attached to the polymer backbone and side chains are fluorine atoms.

The terms "fully-fluorinated" and "perfluorinated" as used herein are interchangeable and refer to a compound where all of the available hydrogen bonded to carbon have been replaced by fluorine.

All percentages herein are by volume unless otherwise stated.

The invention relates to a process for separating two components, A and B, of a gas mixture. The separation is carried out by running a stream of the gas mixture across a membrane that is selective for the desired component to be separated from another component. The desired component to be separated into the permeate may be either Component A or Component B. The process results, therefore, in a permeate stream enriched in the desired component and a residue stream depleted in that component.

In a basic embodiment, the process of the invention includes the following steps:

(a) passing the gas mixture across a separation membrane having a feed side and a permeate side, the separation membrane having a selective layer comprising a copolymer formed from at least two perfluorodioxolane monomers;

(b) providing a driving force for transmembrane permeation;

(c) withdrawing from the permeate side a permeate stream enriched in component A compared to the gas mixture;

(d) withdrawing from the feed side a residue stream depleted in component A compared to the gas mixture.

At least the selective layer responsible for the gas discriminating properties of the membrane is made from a glassy copolymer. The copolymer should be substantially amorphous. Crystalline polymers are typically essentially insoluble and thus render membrane making difficult, as well as exhibiting generally very low gas permeabilities. Crystalline polymers are not normally suitable for the selective layer, therefore.

The selective layer copolymer should be fluorinated, and generally the degree of fluorination should be high to increase the chemical inertness and resistance of the material. By high, we mean having a fluorine:carbon ratio of atoms in the polymer of at least 1:1. Most preferably, the polymer is perfluorinated, even if the perfluorinated structure has less than a 1:1 fluorine:carbon ratio.

Various materials may be used for the copolymeric selective layer to meet the characterizing requirements. These include copolymers comprising perfluorinated dioxolane monomers.

The perfluorinated dioxolane monomers as described herein are characterized by a 1,3-dioxolane ring, having the general form:

Preferred monomers may be selected from perfluoro-2-methylene-1,3-dioxolane or derivatives thereof containing various substituent groups at the fourth and fifth positions of the dioxolane ring. These monomers are represented by the structures found in Table 1, above.

None of the structures in Table 1 are new monomers in themselves. Generally, dioxolanes can be prepared by acetalization of aldehydes and ketalization of ketones with ethylene glycol. Formulations embracing those suitable for use in the invention are described in U.S. Pat. Nos. 3,308,107; 5,051,114; 7,754,901; 7,635,780; and 8,168,808, incorporated herein by reference. The homopolymers of the monomers in Table 1 may be prepared by direct fluorination of hydrocarbon precursors and polymerized using perfluoro dibenzoyl peroxide as a free radical initiator to yield a linear polymer. The resulting polymers are soluble in fluorinated solvents, such as hexafluorobenzene, perfluoro-hexane, and fluorinated FC43 (3M™). Copolymerization of the monomers in Table 1 may also be carried out in bulk and in a hexafluorobenzene solution using perfluoro dibenzoyl peroxide.

In a preferred embodiment, the selective layer comprises a copolymer of the perfluorodioxolane monomers found in Table 1. Thus, the separation membrane may have a selective layer comprising a copolymer formed from a first perfluorodioxolane monomer and a second, different perfluorodioxolane monomer. Any combination of perfluorodioxolane monomers found in Table 1 may be used.

A homopolymer of perfluoro-2-methylene-1,3-dioxolane (Monomer H) is crystalline in nature, which was confirmed by Mikeš et al., "Characterization and Properties of Semi-crystalline and Amorphous Perfluoropolymer: poly(perfluoro-2-methylene-1,3-dioxolane)," Polymers for Advanced Technologies, v. 22, pp. 1272-1277 (2011). This crystallinity reflects the ability of the repeat unit in the homopolymer of Monomer H to pack tightly, forming ordered structures. As a result, Monomer H does not dissolve in fluorinated solvents. However, as described herein, copolymerizing Monomer H with another dioxolane monomer from Table 1 in the appropriate amounts results in an amorphous structure, which is desirable for gas separation membrane materials.

In other embodiments, the copolymer may comprise more than two perfluorodioxolane monomers.

In a more preferred embodiment, the separation membrane has a selective layer comprising a copolymer formed from a first perfluorodioxolane monomer having the formula

and a second perfluorodioxolane monomer having the formula

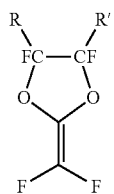

where R and R' are fluorine and/or alkylfluoro groups.

Preferably, in some embodiments, the separation membrane has a selective layer comprising a copolymer formed from a first perfluorodioxolane monomer having the formula

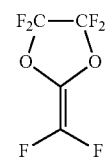

and a second perfluorodioxolane monomer selected from Table 1, wherein the second perfluorodioxolane monomer is not Monomer H.

Unlike Monomer H, Monomer D is more bulky and frustrates polymer chain packing, yielding a selective layer with higher free volume and higher gas permeability. Thus, in a most preferred embodiment, the copolymer comprises monomers of perfluoro-2-methylene-1,3-dioxolane (Monomer H) and perfluoro-2-methylene-4,5-dimethyl-1,3,-dioxolane (Monomer D).

When any pair of monomers is used, one will tend to be more densely packed and perhaps crystalline than the other, and the respective proportions of the two monomers will alter the membrane properties. As a representative, non-limiting example, FIG. 1 shows the effect of the ratio of Monomers D and H on the performance of the resulting gas separation membrane. An appropriate amount of Monomer D (or another monomer from Table 1 other than Monomer H) is required to yield an amorphous copolymer with Monomer H. However, an appropriate amount of Monomer H is required to yield copolymers with high selectivity; too much of Monomer D (or another monomer from Table 1 other than Monomer H) results in an amorphous copolymer with relatively low gas selectivity.

Within the range of amorphous copolymers of D and H, there is a trade-off between permeance and selectivity. Relatively large proportions of D increase permeance at the expense of selectivity, and relatively large proportions of H increase selectivity at the expense of permeance. A preferred proportion of Monomer H is at least 25 mol %, more preferably at least 40 mol %, and most preferable at least 55 mol %.

Thus, the preferred copolymer has just enough of Monomer D, or in a different embodiment, another monomer selected from Table 1 other than Monomer H, to give an amorphous copolymer, but retains enough of Monomer H to yield high gas selectivity.

With the perfluoropolymers described herein, the bonding of the monomers occurs outside the main dioxolane ring. This process is different than dioxole polymerization, which polymerize by the opening of a double bond within a five-member ring.

Copolymerization of the perfluoromonomers is represented by the following exemplary formula:

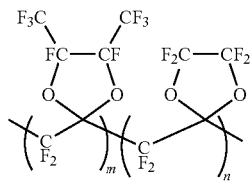

where m and n are positive integers.

In a preferred embodiment, the copolymer is an ideal random copolymer.

In yet another embodiment, the selective layer of the separation membrane may comprise a copolymer formed from a perfluorodioxolane monomer selected from the group consisting of the structures found in Table 1 and a perfluorodioxole monomer, such as Teflon® AF and Hyflon® AD, or a polyperfluoro (alkenyl vinyl ether) monomer, such as Cytop®.

The copolymer chosen for the selective layer can be used to form films or membranes by any convenient technique known in the art, and may take diverse forms. Because the polymers are glassy and rigid, an unsupported film, tube or fiber of the polymer may be usable in principle as a single-layer membrane. However, such single-layer films will normally be too thick to yield acceptable transmembrane flux, and in practice, the separation membrane usually comprises a very thin selective layer that forms part of a thicker structure. This may be, for example, an integral asymmetric membrane, comprising a dense skin region that forms the selective layer and a microporous support region. Such membranes were originally developed by Loeb and Sourirajan, and their preparation in flat sheet or hollow fiber form is now conventional in the art and is described, for example, in U.S. Pat. No. 3,133,132 to Loeb, and U.S. Pat. No. 4,230,463 to Henis and Tripodi.

As a further, and a preferred, alternative, the membrane may be a composite membrane, that is, a membrane having multiple layers. Modern composite membranes typically comprise a highly permeable but relatively non-selective support membrane, which provides mechanical strength, coated with a thin selective layer of another material that is primarily responsible for the separation properties. Typically, but not necessarily, such a composite membrane is made by solution-casting the support membrane, then solution-coating the selective layer. General preparation techniques for making composite membranes of this type are well known, and are described, for example, in U.S. Pat. No. 4,243,701 to Riley et al., incorporated herein by reference.

Again, the membrane may take flat-sheet, tube or hollow-fiber form. The most preferred support membranes are those with an asymmetric structure, which provides a smooth, comparatively dense surface on which to coat the selective layer. Support membranes are themselves frequently cast onto a backing web of paper or fabric. As an alternative to coating onto a support membrane, it is also possible to make a composite membrane by solution-casting the polymer directly onto a non-removable backing web, as mentioned above. In hollow-fiber form, multilayer composite membranes may be made by a coating procedure as taught, for example, in U.S. Pat. Nos. 4,863,761; 5,242,636; and 5,156,888, or by using a double-capillary spinneret of the type taught in U.S. Pat. Nos. 5,141,642 and 5,318,417.

A gutter layer may optionally be used between the support membrane and the selective layer, for example to smooth the support surface and channel fluid to the support membrane pores. In this case, the support membrane is first coated with the gutter layer, then with the perfluoro selective layer as described herein.

Multiple selective layers may also be used.

The thickness of the selective layer or skin of the membranes can be chosen according to the proposed use, but will generally be no thicker than 5 μm, and typically no thicker than 1 μm. It is preferred that the selective layer be sufficiently thin that the membrane provide a pressure-normalized hydrogen flux, as measured with pure hydrogen gas at 25° C., of at least about 100 GPU (where 1 GPU=1×10$^{-6}$ cm$^3$(STP)/cm$^2$·s·cmHg), more preferably at least about 200 GPU and most preferably at least about 400 GPU. In a preferred embodiment, the selective layer thickness is no greater than about 0.5 μm, and most preferably between about 0.3 μm and 0.5 μm.

Once formed, the membranes exhibit a combination of good mechanical properties, thermal stability, and high chemical resistance. The fluorocarbon polymers that form the selective layer are typically insoluble except in perfluorinated solvents and are resistant to acids, alkalis, oils, low-molecular-weight esters, ethers and ketones, aliphatic and aromatic hydrocarbons, and oxidizing agents, making them suitable for use not only in the presence of C$_{3+}$ hydrocarbons, but in many other hostile environments.

The membranes of the invention may be prepared in any known membrane form and housed in any convenient type of housing and separation unit. We prefer to prepare the membranes in flat-sheet form and to house them in spiral-wound modules. However, flat-sheet membranes may also be mounted in plate-and-frame modules or in any other way. If the membranes are prepared in the form of hollow fibers or tubes, they may be potted in cylindrical housings or otherwise.

The membrane separation unit comprises one or more membrane modules. The number of membrane modules required will vary according to the volume of gas to be treated, the composition of the feed gas, the desired compositions of the permeate and residue streams, the operating pressure of the system, and the available membrane area per module. Systems may contain as few as one membrane module or as many as several hundred or more. The modules may be housed individually in pressure vessels or multiple elements may be mounted together in a sealed housing of appropriate diameter and length.

Of particular importance, the membranes and processes of the invention are useful in applications for producing hydrogen or chemicals from hydrocarbon feedstocks, such as reforming or gasification processes followed by separation or chemical synthesis. Steam reforming is well known in the chemical processing arts, and involves the formation of various gas mixtures commonly known as synthesis gas or syngas from a light hydrocarbon feedstock, steam and optionally other gases, such as air, oxygen or nitrogen. Synthesis gas usually contains at least hydrogen, carbon dioxide, carbon monoxide and methane, but the exact composition can be varied depending on its intended use.

Plant design and process operating conditions thus differ in their details but the steam reforming process always includes a basic steam/hydrocarbon reforming reaction step, carried out at high temperature and elevated pressure, and one or more subsequent treatments of the raw synthesis gas to remove carbon dioxide or make other adjustments to the gas composition. The processes of the invention are expected to be especially useful in carrying out such treatments.

In another aspect, the invention is a process for separating carbon dioxide from methane, especially if the mixture also contains $C_{3+}$ hydrocarbon vapors. Such a mixture might be encountered during the processing of natural gas, of associated gas from oil wells, or of certain petrochemical streams, for example. The processes of the invention are expected to be useful as part of the gas treatment train, either in the field or at a gas processing plant, for example.

In another aspect, the invention is a process for recovering helium from natural gas. Helium is a rare gas on Earth. Almost all of the commercial helium requirements are supplied by extraction from helium-containing natural gas by low temperature fractional distillation processes. The resulting helium rich gases are further purified or refined using additional cryogenic distillation steps or by pressure swing adsorption (PSA) processes which selectively remove other gases. These final refining steps result in commercial grades of helium in excess of 99.9%. The processes of the invention are expected to be useful in replacing or supplementing one or more of the unit operations in the helium recovery plant.

In yet another aspect, the invention is a process for separating nitrogen from natural gas. The goal will often be to reduce the nitrogen content of the natural gas to no more than about 4% nitrogen, which is an acceptable total inerts value for pipeline gas. In other circumstances, a higher or lower nitrogen target value may be required. Once again, the processes of the invention are expected to be useful in field or plant equipment as stand alone or supplementary units to meet the desired nitrogen concentration target.

Additionally, in another aspect, the invention is a process for separating oxygen from nitrogen. Oxygen is used to enhance the combustion of all fuels, enabling improved burning zone control, and lowering emissions. The present invention is expected to yield enriched oxygen that can be used advantageously in combustion processes, such as kilns, or when using low-grade fuels, where reduction in ballast nitrogen is beneficial.

In a further aspect, the invention is a process for separating water from alcohols, such as ethanol, particularly bioethanol produced from natural sources. A major drawback to more economical use of bioethanol as a fuel is the energy used to grow the feedstock, to ferment it, and to separate a dry ethanol product from the fermentation broth. The processes of the invention are expected to be useful in lowering the energy costs associated with ethanol separation (dehydration).

The invention is now illustrated in further detail by specific examples. These examples are intended to further clarify the invention, and are not intended to limit the scope in any way.

EXAMPLES

Example 1: Membrane Preparation

Composite membranes were prepared using homopolymer and copolymer solutions prepared from the monomers found in Table 2. For Polymers 443-445, different compositions (mol %) of Monomers D and H were used.

The perfluoro selective layers were coated onto support membranes, either on a small coater or by hand coating, and the membranes were finished by oven drying. Samples of each finished composite membrane were then cut into 13.8 cm² stamps.

Example 2: Pure-Gas Testing of the Perfluoro Composite Membranes

The membranes were dried in order to remove any residual solvents and then tested in a permeation test-cell apparatus with pure gases at room temperature, 50 psig feed pressure, and 0 psig permeate pressure. The gas fluxes of the membranes were measured, and the permeances and selectivities were calculated.

For comparative purposes, tests were also run with membranes having selective layers made from several formulations of Hyflon® AD, Cytop®, and Teflon® AF.

The results for the different homopolymers and copolymers tested are shown in Table 2, below:

TABLE 2

| | | Pure-Gas Permeation Results | | | | | | | |
|---|---|---|---|---|---|---|---|---|---|
| | Monomer | Pure-Gas Permeance (GPU) | | | | Pure-Gas Selectivity | | | |
| Sample | Composition | $N_2$ | $H_2$ | He | $CO_2$ | $N_2/CH_4$ | $H_2/CH_4$ | $He/CH_4$ | $CO_2/CH_4$ |
| Polymer 443 | 43 mol % D/ 57 mol % H | 28 | 695 | 1,370 | 256 | 5.3 | 129 | 258 | 47 |

TABLE 2-continued

| | | Pure-Gas Permeation Results | | | | | | | |
|---|---|---|---|---|---|---|---|---|---|
| | Monomer | Pure-Gas Permeance (GPU) | | | | Pure-Gas Selectivity | | | |
| Sample | Composition | $N_2$ | $H_2$ | He | $CO_2$ | $N_2/CH_4$ | $H_2/CH_4$ | $He/CH_4$ | $CO_2/CH_4$ |
| Polymer 444 | 58 mol % D/ 42 mol % H | 41 | 704 | 1,250 | 328 | 4.2 | 72 | 130 | 34 |
| Polymer 445 | 74 mol % D/ 26 mol % H | 54 | 822 | 1,410 | 388 | 3.2 | 48 | 82 | 23 |
| Hyflon ® AD60 | | 176 | 1,730 | 2,600 | 1,330 | 2.4 | 23 | 34 | 18 |
| Hyflon ® AD40 | | 33 | 446 | 1,120 | 268 | 2.7 | 36 | 90 | 22 |
| Cytop ® | | 18 | 292 | 788 | 153 | 3.0 | 48 | 130 | 25 |
| Teflon ® AF2400 | | 2,700 | 10,500 | 10,500 | 13,000 | 1.2 | 4.6 | 4.6 | 5.8 |

From Table 2, in most cases Polymer 443 has better selectivity performance for pure gas pairs than Hyflon® AD, Cytop®, and Teflon® AF.

Additionally, as can be seen in FIGS. 2-5, Polymer 443 performed well above the upper bound tradeoff line defined by the conventional perfluoropolymer membranes for hydrogen/methane, nitrogen/methane, helium/methane, and carbon dioxide/methane separations.

We claim:

1. A process for separating two components, A and B, of a gas mixture, comprising:
   (a) passing the gas mixture across a separation membrane having a feed side and a permeate side, the separation membrane having a selective layer comprising a copolymer comprising at least two perfluorodioxolane monomers;
   (b) providing a driving force for transmembrane permeation;
   (c) withdrawing from the permeate side a permeate stream enriched in component A compared to the gas mixture; and
   (d) withdrawing from the feed side a residue stream depleted in component A compared to the gas mixture.

2. The process of claim 1, wherein at least one perfluorodioxolane monomer is selected from the group consisting of:

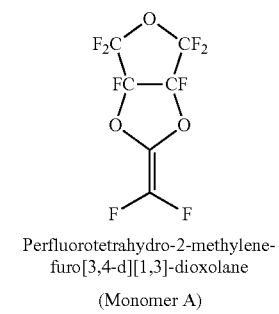

Perfluorotetrahydro-2-methylene-furo[3,4-d][1,3]-dioxolane
(Monomer A)

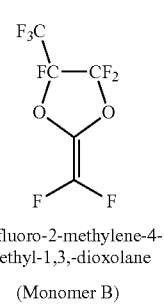

Perfluoro-2-methylene-4-methyl-1,3,-dioxolane
(Monomer B)

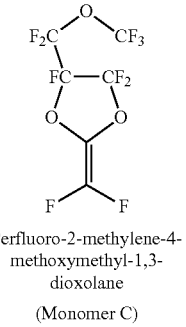

Perfluoro-2-methylene-4-methoxymethyl-1,3-dioxolane
(Monomer C)

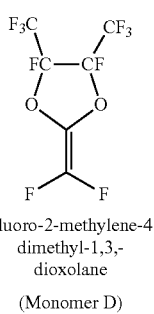

Perfluoro-2-methylene-4,5-dimethyl-1,3,-dioxolane
(Monomer D)

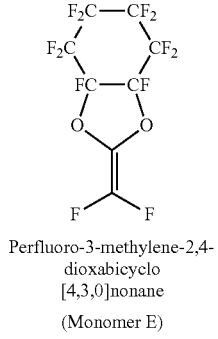

Perfluoro-3-methylene-2,4-dioxabicyclo[4,3,0]nonane
(Monomer E)

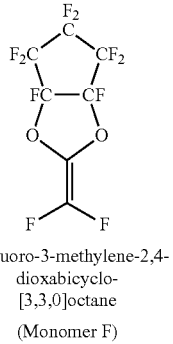

Perfluoro-3-methylene-2,4-dioxabicyclo-[3,3,0]octane
(Monomer F)

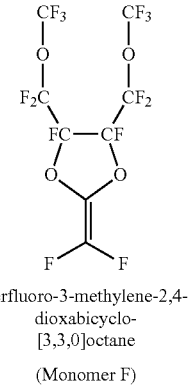

Perfluoro-3-methylene-2,4-dioxabicyclo-[3,3,0]octane
(Monomer F)

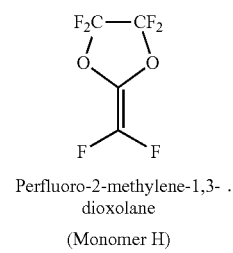

Perfluoro-2-methylene-1,3-. dioxolane
(Monomer H)

3. The process of claim 1, wherein component A is chosen from the group consisting of hydrogen, carbon dioxide, nitrogen, helium and organic compounds.

4. The process of claim 1, wherein component A is hydrogen.

5. The process of claim 1, wherein component A is carbon dioxide.

6. The process of claim 1, wherein component A is nitrogen.

7. The process of claim 1, wherein component A is helium.

8. The process of claim 1, wherein component B is methane.

9. The process of claim 1, wherein the gas mixture further comprises methane and $C_{3+}$ hydrocarbon vapors.

10. The process of claim 1, wherein component A is nitrogen and component B is methane.

11. The process of claim 1, wherein component A is carbon dioxide and component B is methane.

12. The process of claim 1, wherein component A is hydrogen and component B is methane.

13. The process of claim 1, wherein component A is helium and component B is methane.

14. A process for separating two components, A and B, of a gas mixture, comprising:
   (a) passing the gas mixture across a separation membrane having a feed side and a permeate side, the separation membrane having a selective layer comprising a copolymer comprising a perfluorodioxolane monomer having the formula

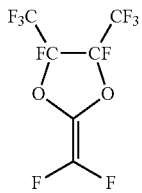

Perfluoro-2-methylene-4,5-dimethyl-1,3,-dioxolane, and
   a perfluoro-2-methylene-1,3-dioxolane-based derivative;
   (b) providing a driving force for transmembrane permeation;
   (c) withdrawing from the permeate side a permeate stream enriched in component A compared to the gas mixture; and
   (d) withdrawing from the feed side a residue stream depleted in component A compared to the gas mixture.

15. The process of claim 14, wherein the perfluoro-2-methylene-1,3-dioxolane-based derivative is selected from the group consisting of:

(Monomer A)

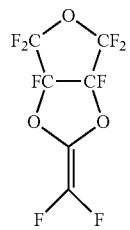

Perfluorotetrahydro-2-methylene-furo[3,4-d][1,3]-dioxolane (Monomer B)

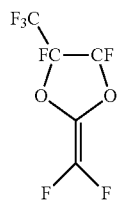

Perfluoro-2-methylene-4-methyl-1,3,-dioxolane (Monomer C)

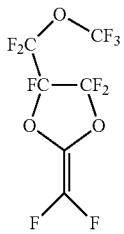

Perfluoro-2-methylene-4-methoxymethyl-1,3-dioxolane (Monomer E)

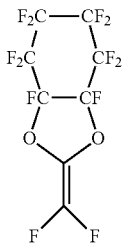

Perfluoro-3-methylene-2,4-dioxabicyclo[4,3,0]nonane (Monomer F)

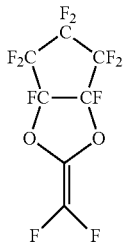

Perfluoro-3-methylene-2,4-dioxabicyclo[3,3,0]octane (Monomer G)

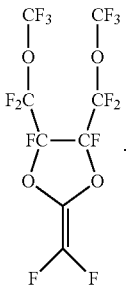

Perfluoro-2-methylene-4,5-dimethoxymethyl-1,3-dioxolane

16. The process of claim 14, wherein component A is chosen from the group consisting of hydrogen, carbon dioxide, nitrogen, helium and organic compounds.

17. The process of claim 14, wherein component A is nitrogen and component B is methane.

18. The process of claim 14, wherein component A is carbon dioxide and component B is methane.

19. The process of claim 14, wherein component A is hydrogen and component B is methane.

20. The process of claim 14, wherein component A is helium and component B is methane.

21. The process of claim 1, wherein the copolymer comprises at least Monomer B and Monomer H.

* * * * *